(12) United States Patent
Dahyabhai et al.

(10) Patent No.: US 7,415,673 B2
(45) Date of Patent: **\*Aug. 19, 2008**

(54) EXTENSIBLE RESOURCE RESOLUTION FRAMEWORK

(75) Inventors: Nitin Somabhai Dahyabhai, Cary, NC (US); Lawrence Alan Mandel, Toronto (CA); Craig Salter, Hamilton (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/846,760

(22) Filed: Aug. 29, 2007

(65) Prior Publication Data

US 2007/0294451 A1    Dec. 20, 2007

Related U.S. Application Data

(63) Continuation of application No. 11/260,793, filed on Oct. 27, 2005.

(51) Int. Cl.
*G06F 3/00* (2006.01)

(52) U.S. Cl. .................................... 715/760; 717/120

(58) Field of Classification Search ................. 715/760, 715/500, 515–516; 717/120
See application file for complete search history.

(56) References Cited

U.S. PATENT DOCUMENTS

| 7,219,350 B2 * | 5/2007 | Bhogal et al. ............... 719/310 |
| 2006/0165060 A1 * | 7/2006 | Dua ............................ 370/352 |
| 2006/0184866 A1 * | 8/2006 | Rees ........................... 715/500 |

* cited by examiner

*Primary Examiner*—Clifford H Knoll
(74) *Attorney, Agent, or Firm*—Marcia L. Doubet; Andre M. Gibbs

(57) ABSTRACT

An extensible resource resolution framework. Executing code that references a resource invokes an interface of an extensible resource resolution framework. Parameters may be provided on the invocation to specify information pertaining to the current execution context. One or more resource resolvers are selected, transparently to the invoking code, as appropriate to a given situation (comprising, for example, the execution context). Preferably, the resource resolvers are contributed as plug-ins to the resolution framework. Criteria may be specified for each resolver, indicating when that resolver should be selected. Priority order may be specified, per resolver, to control order of invocation when more than one resolver is selected.

15 Claims, 7 Drawing Sheets

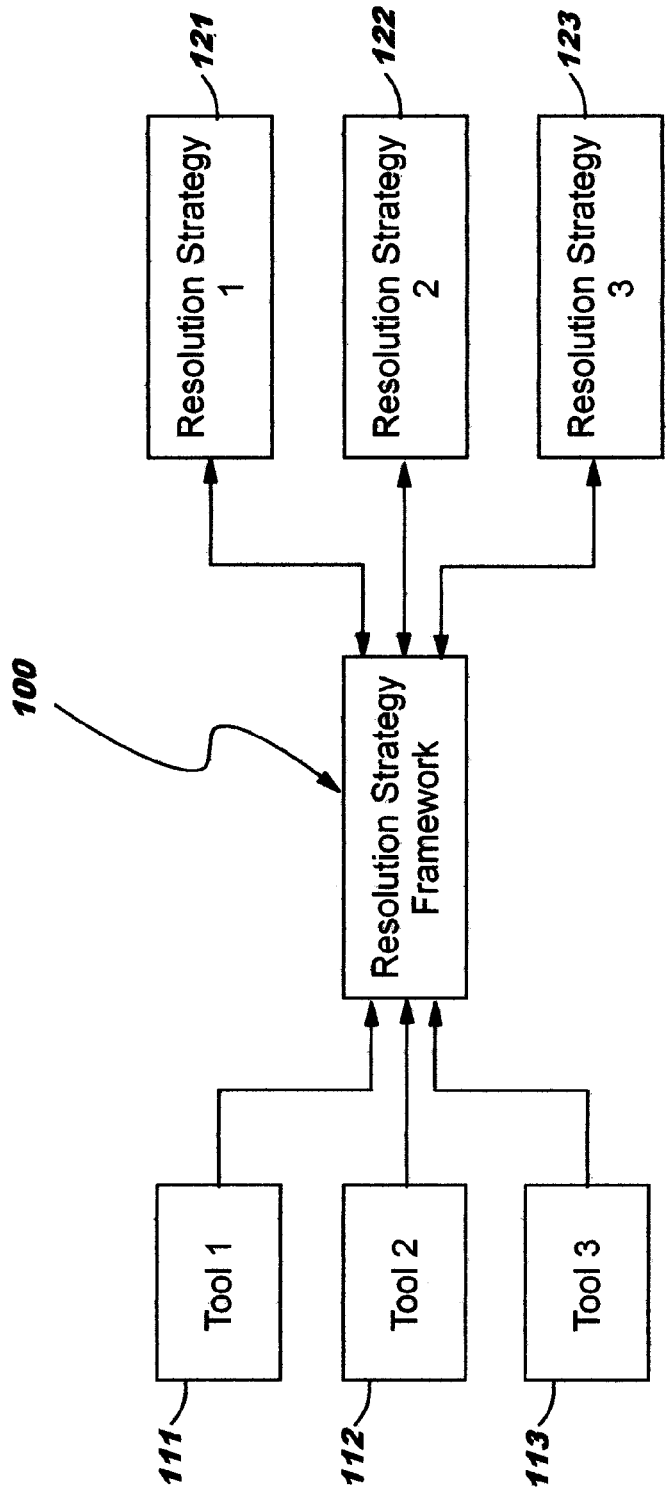

FIG. 4

```
400
      410
<extension point="com.ibm.etools.uriresolver.resolverExtension">
   <resolverExtension
411   class="com.ibm.etools.webproject.resolver.WebProjectURIResolverExtension"
412   projectNature="com.ibm.etools.webnature"
413   fileType="*.wsdl"
414   resolutionStage="prenormalization"
415   priority="3"           <!-- preferred values are 1 .. 5, with default value = 3 -->
   </resolverExtension>
</extension>
```

EXTENSIBLE RESOURCE RESOLUTION FRAMEWORK

BACKGROUND OF THE INVENTION

The present invention relates generally to computer programming, and more particularly to resource resolution.

Many software tools which must locate resources (such as files) as part of their function have to implement a resource resolution strategy, whereby addressing information for the resource can be resolved to an actual physical storage location. Currently, each tool (including, when applicable, multiple tools that are provided within a single software product) must implement the strategy independently. This requires a considerable amount of duplicate effort by developers and a lot of effort to keep resolution strategies synchronized among different tools (which may be developed by different organizations).

As an example, software components often need to operate on collections of resources that are related by Uniform Resource Identifier ("URI") references. A web browser, for example, operates on a Hypertext Markup Language ("HTML") resource which can contain references to other HTML resources. The process of reading a URI reference and computing the actual location where the resource can be obtained is known generally as "URI resolution". In modern software applications, the process of resolving a URI reference has become more complex, with different software components utilizing specialized resolution strategies specific to their problem domain. When several software components need to work together, dealing with the multiple resolution strategies makes software development more difficult. Often, in order to resolve a URI, a software developer needs to be aware of multiple resolution strategies and understand when to invoke the appropriate one. Once the appropriate strategy is determined, the task of invoking this strategy may be non-trivial. There are often significant differences between the way each resolver strategy is implemented, and the developer is therefore forced to become familiar with domain-specific peculiarities.

BRIEF SUMMARY OF THE INVENTION

In one aspect, the present invention provides a resource resolver system. This resource resolver system preferably comprises an extensible resource resolution framework, the framework adapted for extension using at least one resource resolver, each resource resolver adapted for resolving resources, the framework further adapted for dynamically selecting and invoking at least one of the at least one resource resolvers upon receiving a request for resolution of a resource, wherein the at least one invoked resource resolver contributes to a resolution result, responsive to its invocation, and the framework returns the resolution result as a response to the resolution request.

The resource resolvers are preferably adapted for use as plug-ins to the framework. Preferably, each of the at least one resource resolvers is registered with a resolver extension registry, and the framework searches the resolver extension registry to perform the dynamic selection from among the registered resource resolvers.

Preferably, each of the at least one dynamically-selected resource resolvers is selected based upon a current execution context, each of the selected resource resolvers adapted for use with this current execution context.

In another aspect, the present invention provides techniques for resolving resources, comprising: receiving, at a resource resolution interface component, a request for resolving a resource; selecting, by the resource resolution interface component, at least one resource resolver for resolving the resource, responsive to receiving the request; invoking, by the resource resolution interface component, at least one of the selected resource resolvers to resolve the resource, such that a resolution result is obtained; and returning, by the resource resolution interface component, the resolution result as a response to the request.

Preferably, the request identifies the resource and conveys information usable when making the selection. The conveyed information may comprise at least one parameter specifying execution context information of an execution context from which the request was received. In this case, the execution context information may comprise a location of a resource that referenced the resource to be resolved. As one alternative, the execution context information may comprise a project in which a reference to the resource was encountered, and the request may be generated responsive to encountering the reference.

The identification of the resource may comprise a file type of the resource. The execution context information may comprise a file type of a resource that referenced the resource to be resolved.

In this aspect, the request may identify the resource and convey at least one parameter specifying a location of a resource that referenced the resource to be resolved. Identification of a project in which the reference occurred may be determined using the specified location, in which case the project identification may be used by the selecting step.

A plurality of resource resolvers may be identified in a resolver extension registry, each having associated therewith at least one criterion usable for determining when to select the associated resource resolver. In this case, the selecting step preferably further comprises evaluating the at least one criterion to select from among the plurality of resource resolvers identified in the resolver extension registry.

Optionally, a plurality of resource resolvers may be selected by the selecting step. In this case, the invoking step preferably uses a priority value associated with each resource resolver to determine an order in which to invoke each of the selected resource resolvers. A contribution to the resolution result may be obtained from each of the invoked resource resolvers and passed as input to a next-invoked one of the resource resolvers. In another approach, the invoking step ceases the invocations upon one of the invoked resource resolvers successfully resolving the requested resource to create the resolution result.

In this aspect, each resource resolver may be registered with the resolver extension registry using a resolver specification that identifies a location of an implementation of the resolver, and the invoking step may then use the identified location. The resolver specification may further specify a file type value, in which case the selecting step preferably compares the file type value to a file type from the request to determine whether to select this resource resolver. In addition or instead, the resolver specification may further specify a project identifier value, in which case the selecting step preferably compares the project identifier value to a project identifier from the request to determine whether to select this resource resolver.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIG. 1 illustrates a common resource resolution strategy framework used in preferred embodiments;

FIG. 2 illustrates a sample interface of a resource resolver;

FIG. 4 illustrates a portion of a plug-in file that illustrates how a resolver extension may be contributed;

DETAILED DESCRIPTION OF THE INVENTION

Figure 3:
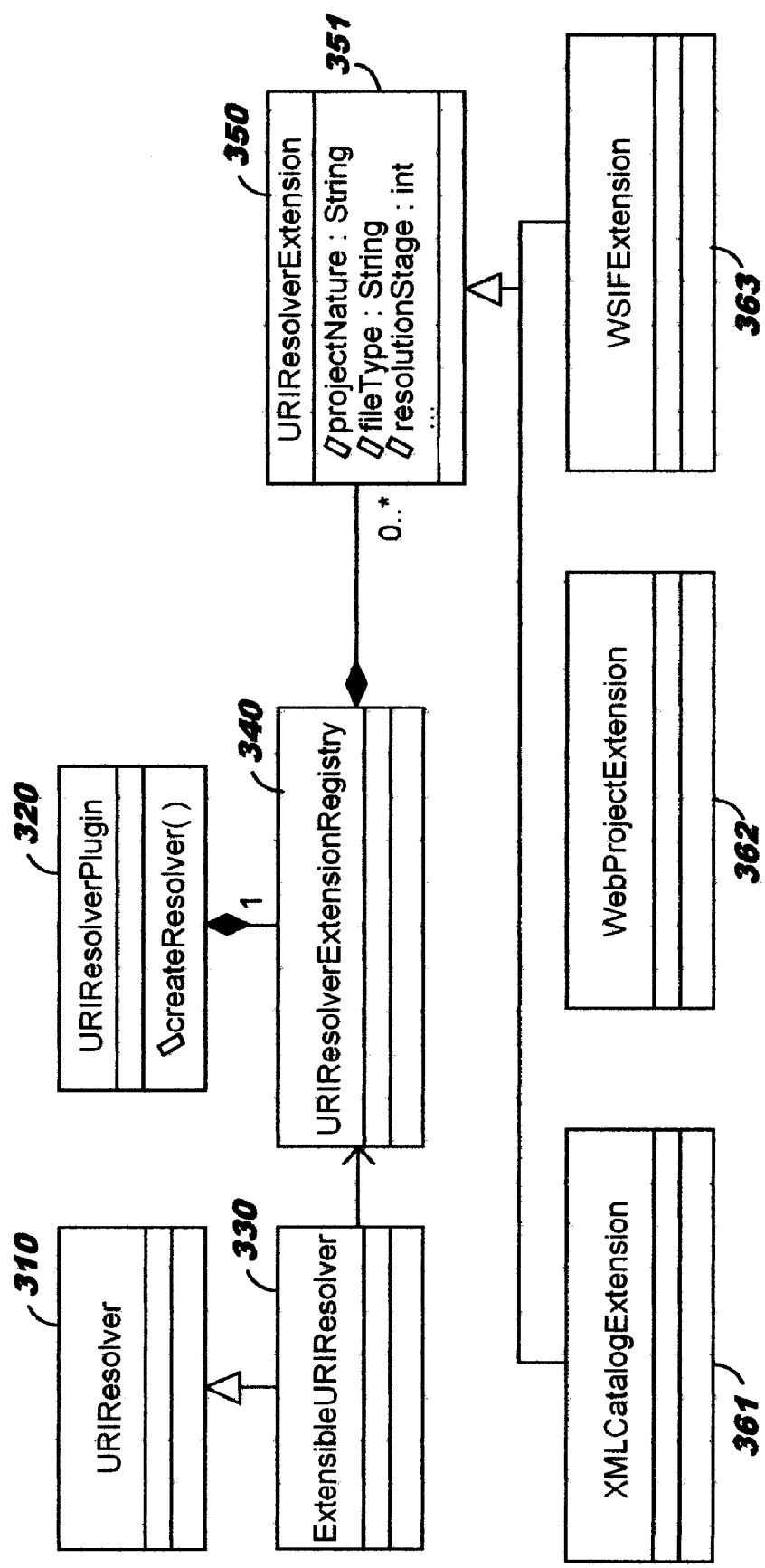
FIG. 3 illustrates an extension structure that may be used with the resource resolver framework disclosed herein.

Preferred embodiments are directed toward simplifying the task of developing software that involves multiple resolution strategies. A resolver framework is disclosed, and this framework can be extended to provide domain-specific resolver strategies as needed. The framework of preferred embodiments presents a software developer with a relatively simple facade of a single resolver component. Internally, the framework deals with the complexities of invoking the various resolver strategies, after first determining which strategy is appropriate for a given context.

The resource resolver framework of preferred embodiments is based upon concepts comprising:

(1) Software involving multiple resolution strategies can be simplified if the logic required to select an appropriate strategy for a given context is provided by the strategy itself. By making the strategy "self selective", details of the selection determination can be concealed from the resolver client (i.e., the code which needs a resource resolution).

(2) The logic required to select an appropriate resolution strategy may be based on a few relatively simple values that may be deduced from the context in which the resolution request occurs. By formalizing these values and making them available to the resolution strategy, it becomes easier to control the conditions under which particular strategies are applied. As will be described in more detail herein, preferred embodiments leverage one or more of the following values: referenced file type; referencee file type; referencee file system location; and referencee project structure metadata. ("Referencee" in this sense refers generally to the environment from which the resource resolution is requested.)

(3) In practice, resolver strategies are often composed or "chained together". That is, a sequence of resolvers may be invoked for a particular resource resolution. In some scenarios, for example, path statements are used in a sequential manner to attempt locating a resource in several potential locations. Unfortunately, this chaining has required hard-coded dependencies in order to explicitly reference strategy implementations. These dependencies can be eliminated if, as disclosed herein, the framework supports the notion of multiple applicable resolver strategies. If several strategies are deemed to be applicable for a given context, each strategy can be applied iteratively to compute a final resolution result. (When multiple strategies are to be applied using the resolution framework disclosed herein, issues related to ordering and priority among the different strategies may be addressed in a variety of ways, including by use of a priority description that is processed by the framework or by the resolution strategies.)

Benefits are provided, using techniques disclosed herein, for people in several different roles. Software developers benefit by removal of the requirement to understand (and interact with) a variety of context-specific resolution strategies, and through simpler integration of product resource resolution strategies. Development complexity is also reduced as the dependencies required for component development are reduced. Furthermore, specific developers can be assigned responsibility for specific resolution strategies, and when necessary, can make changes across a product by making a change in one location.

Third-party contributors, such as toolkit providers, may also benefit by using extensible techniques disclosed herein. For example, a specific resource resolution strategy can now be dictated by a third-party contributor, across a product, whereas this option was not previously available due to lack of the necessary access to modify existing product tooling. Third-party contributors may also more easily integrate tools that follow the product resolution strategy of a product for which their code is being contributed.

End-user benefits include a more consistent "look and feel" for tools included within a product, as all the tools may now have the same resource resolution strategy. Furthermore, inconsistent results and resolution failures that may have occurred using prior art techniques may be avoided.

Turning now to FIG. 1, a common resource resolution strategy framework 100 used in preferred embodiments will now be described, as illustrated therein. The framework of preferred embodiments has one or more extension points where external resolvers implementing specific resolution strategies can plug in to the resolution framework. See, for example, reference numbers 121-123, which illustrate 3 sample extensions plugged in to framework 100. With this framework, specific tools (exemplified by tools depicted at reference numbers 111-113)—rather than implementing resolution strategies individually—now refer to the resolution strategy framework; the framework decides which resolution strategy to use for a given situation, and invokes the resolution strategy on behalf of the tool. (The manner in which a particular situation is mapped to a resolution strategy for selection by the framework may vary, without deviating from the scope of the present invention, and a variety of criteria may be considered. As an example, the referencee project type may be used. Strategy selection and mappings are described in more detail below.)

According to preferred embodiments, the resource resolver framework disclosed herein (also referred to generally as "the resource resolver") is invoked by a tool that processes documents (such as HTML or Extensible Markup Language, or "XML", documents) in order to resolve references to other documents. The resource resolver may be represented by an interface providing a single invocable method. A sample thereof is depicted at reference number 200 in FIG. 2. As shown therein, input parameter values may comprise a "baseLocation" 210, a "publicID" 220, and a "systemID" 230. These parameters will now be described in more detail.

The "baseLocation" parameter 210 is shown (by way of illustration only) as being a string, and specifies a base location of the resource that is currently being processed and that is referencing a resource to be resolved. The base location (referred to equivalently herein as the "referencee file system location") may be used to infer the project that holds this current resource. (For example, the value of the "baseLocation" parameter may be passed to a method that determines the project, given this input, by consulting a configuration file or mapping.) Knowing the current project may be useful in resource resolution as it may be indicative of (for example) a path statement to be used when resolving a resource; and, in general, knowing the current project enables obtaining the previously-referenced "referencee project structure metadata" which may, in turn, provide additional useful information for resource resolution. If a particular project uses proprietary tools, for example, then project-specific resolvers can be identified and used when resolving resource references within this project, without making those resolvers generally applicable outside the project.

The "publicID" parameter 220 is also shown (by way of illustration only) as being a string, and is optional in preferred embodiments. This string value is preferably a namespace or "DOCTYPE" identifier. For example, this parameter may be used to specify the namespace value of an XML schema file. This parameter may be used to specify (or infer) the "referencee file type" that was discussed above.

The "systemID" parameter 230 is shown (by way of illustration only) as being a string, and references the resource to be resolved. For example, the value of this parameter may be a file name that must be resolved to a fully-qualified file system location. Optionally, the parameter value may indicate whether a local or remote resource is to be obtained, and/or whether the reference is absolute or relative. The "systemID" parameter may be parsed to obtain the "referenced file type" parameter that was discussed above.

Given the input values for a particular invocation, the resolver of preferred embodiments performs any required normalization, mapping, and project-specific resolution in order to compute an absolute URI that specifies the location of the referenced resource. The resource resolver interface 200 of preferred embodiments is designed to be readily reusable among different markup language processors.

According to preferred embodiments, a small lightweight plug-in contains an implementation for the resource resolver interface (i.e., a resource resolution interface component) and an infrastructure to support extension. FIG. 3 illustrates an extension structure for the resource resolver framework disclosed herein, using the well-known Unified Modeling Language ("UML"), as well as several sample extensions 361-363. The URIResolverPlugin component 320 may be used to obtain a URIResolver 310. The obtained resolver preferably utilizes one or more URIResolverExtension 350 (exemplified by extensions 361-363) in order to apply various resolution behaviors. These resolvers may be loaded on-demand, and are passed one or more input values. Preferably, the input values to be passed to a particular resolver are determined using an extension-specific mapping such as a "plugin.xml" file associated with the extension (or in other ways, such as through a different mapping or configuration file). Input values passed to a resolver may include, by way of illustration, values for projectNature, fileType, resolutionStage, and so forth (as indicated at reference number 351).

A preferred approach for providing extensions for use by the extensible resolver framework disclosed herein will now be described. In preferred embodiments, URIResolver 310 is implemented as the internal class ExtensibleURIResolver 330. The ExtensibleURIResolver preferably performs standard URI normalization, as may be necessary, and is directed primarily toward selecting and invoking one or more resource resolver(s), as applicable for a particular reference to be resolved. As mentioned earlier with reference to FIG. 1, tools may contribute a resolver for use in the resolution process and in preferred embodiments, do so using plug-in extension points. As an example, a web tooling plug-in may contribute an extension (as illustrated by the sample "WebProjectExtension" 362 in FIG. 3) to handle resolution details specific to a web project, such as resolving context roots and applying any mapping related to the web project. As another example, an XML catalog plug-in may contribute an extension (as illustrated by the sample "XMLCatalogExtension" 361 in FIG. 3) to perform catalog-based URI mapping. As yet another example, a Web Services Invocation Framework ("WSIF") extension may be provided (as illustrated at 363 in FIG. 3) for use with tools that interact with WSIF documents (i.e., documents that describe Web services to be published via a Web site); accordingly, resources referenced in such documents may be located using the resolver extension 363. The content of the extensions may vary without deviating from the scope of the present invention, and may include (by way of illustration) object-oriented code, markup language specifications, scripting language specifications, and so forth.

Each contributed resolver preferably has associated therewith one or more criteria indicating context criteria under which this resolver should be invoked. Such context criteria values may be specified (for example) in a criteria-to-extension mapping such as a "plugin.xml" file associated with the extension (or in other ways, such as through a different mapping or configuration file). As an example, a mapping may specify that the sample "XMLCatalogExtension" 361 extension is to be invoked when the user is currently interacting with an XML catalog. This mapping may further specify how context values of this current environment are to be mapped to input parameters of the resolver, as noted above with reference to the parameters illustrated at 351.

Mapping information of this type may be registered, for each resolver extension, in a registry. This registry is referred to in FIG. 3 as "URIResolverExtensionRegistry" 340. At run time, this registry can be consulted by the resolver framework to select one or more resolver extensions that should be invoked for resolving a particular resource. (See also FIG. 5.)

Referring now to FIG. 4, an example is provided showing a portion 400 of a plugin.xml file that illustrates how information pertaining to a contributed URIResolverExtension may be specified. An identifier for the extension point is provided; see the attribute at reference number 410. In this example, 5 attributes describing the extension are specified. (Additional, fewer, or different attributes may be used without deviating from the scope of the present invention.) A "class" attribute 411 specifies a class implementing the "URIResolverExtension" 350, identifying the code (as applicable) that will perform the resource resolution when this extension is invoked. A "projectNature" attribute 412 may be used when this extension is only applicable in the context of specific project natures or types. (As mentioned earlier, the project nature may be inferred using information such as the location of the resource from which the reference to be resolved is made. Alternatively, the project nature may be determined in other ways.) In preferred embodiments, if a value is not specified for the "projectNature" attribute, it is assumed that this extension applies to all projects. A "fileType" attribute 413 may be used when this resolver should only be applied to particular file types. In the example of FIG. 4, the value "*.wsdl" for the "fileType" attribute indicates that the extension described at 400 is applicable for resolving all resources referenced from Web Services Description Language ("WSDL") files. Finally, "resolutionStage" attribute 414 and "priority" attribute 415 may be used to specify when the extension should be invoked within the resolution process. In the example, the value "prenormalization" specified for the "resolutionStage" attribute indicates that this extension is to be applied prior to normalization of the URI, and the "priority" attribute value of "3" indicates (when permissible values range between 1 and 5) that this extension is of medium priority. If a priority value of "1" is defined as having highest priority, then the sample extension described in FIG. 4 will be processed (prior to normalization and) after any extensions having priority values of "1" and "2".

Information of the type illustrated in FIG. 4 may be specified in other ways without deviating from the scope of the present invention. Examples include providing plain-text files that specify such information, entry of information using the command line, and so forth.

A set of rules or conventions is used, according to preferred embodiments, during the process of selecting a resource resolver or resolvers to invoke. When using the method signature illustrated in FIG. 2, such rules preferably comprise: (1) ensuring that the value of the "baseLocation" parameter is a fully-qualified, well-formed URI; (2) ensuring that at least one of "publicID" and "systemID" is non-null (and returning a null value, otherwise); (3) ensuring that any non-null result of the resolver invocation is a fully-qualified, well-formed URI; and (4) ensuring that a deterministic resolution result is provided (that is, ensuring that invoking the resolver multiple times with the same input provides the same result). Extension providers should ensure that their extension implementation does not violate any of these rules.

Figure 5:
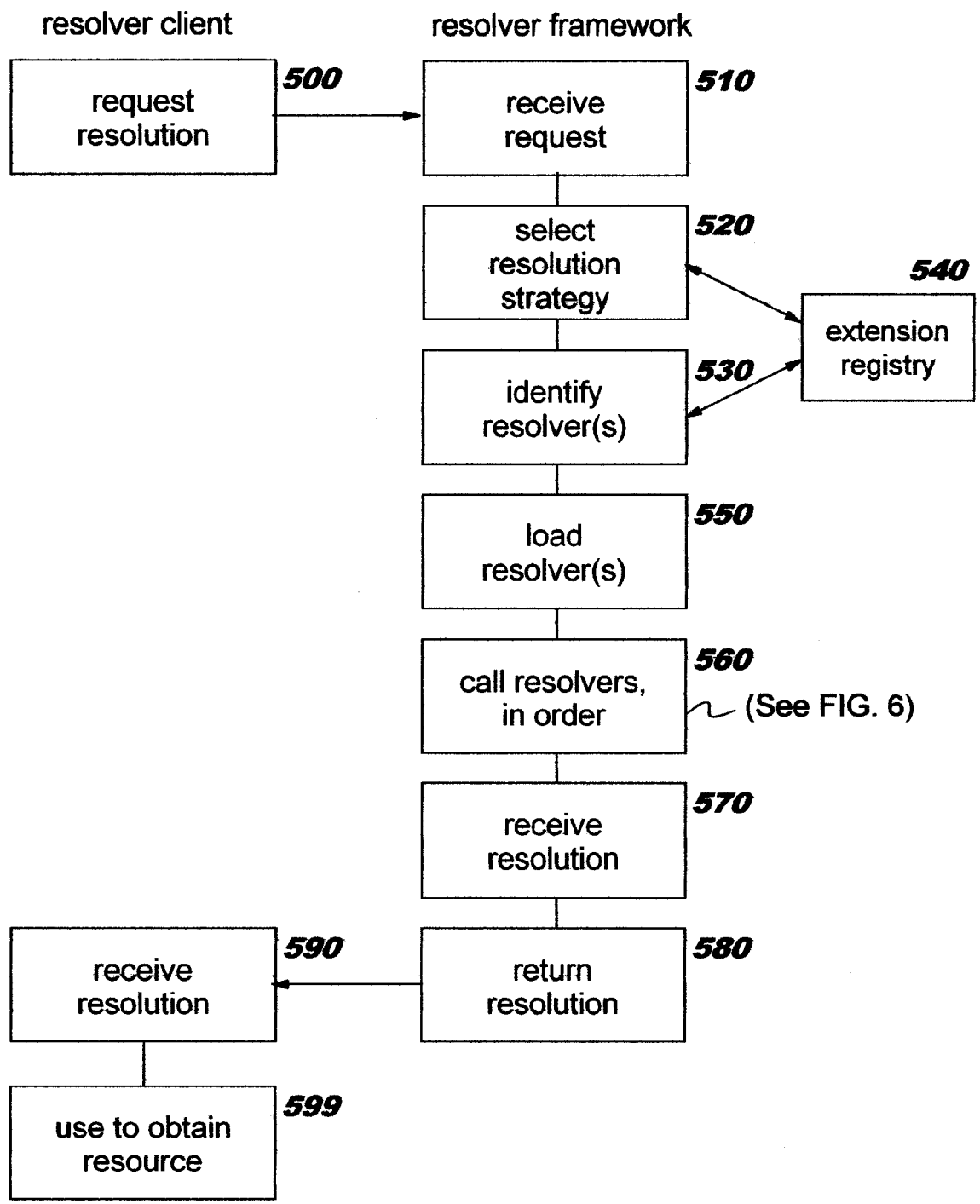
FIG. 5 provides a flowchart depicting a logic flow among components of preferred embodiments.

Referring now to FIG. 5, a flowchart is provided showing a logic flow among components of preferred embodiments. A request is made from an executing code module, referred to in FIG. 5 as the resolver client, for resolution of a resource (Block 500). This request is received at the resource resolver framework (Block 510), which then dynamically selects a resolution strategy (Block 520). Notably, this selection preferably operates in a manner that is transparent to the invoking code.

The resource resolver extension(s) to be used with this strategy are identified (Block 530). Preferably, the processing of Blocks 520 and/or 530 comprises consulting an extension registry 540, using values such as the current execution context (which may be determined, for example, using parameters passed on the resolution request at Block 500), where these values are mapped against criteria indicating when each resolver should be selected, and one or more registry entries may be located that specify the resolver(s) appropriate for a given situation. It may also happen, in some cases, that a resource resolver is not located for a particular resource to be resolved (although this has not been illustrated in FIG. 5). When a resolver is not available, a result of the resolution may be provided to the invoking code as the URI or key passed in the resolution request (bypassing, for example, the processing of Blocks 550-570). Alternatively, a null result may be returned; or, the framework may throw an exception.

Referring again to Block 520, as an example of selecting a resolution strategy for a given situation, suppose that a tool is currently processing a resource named "doc.a", which references a resource named "doc.a1". When resolving (i.e., determining where to find) this resource "doc.a1", it may be informative to know not only the name of the target or "referenced" resource (i.e., "doc.a1"), but also the name of the source or "referencee" resource (i.e., "doc.a", in this example). An entry might be specified in the URI resolver extension registry 540 indicating that whenever files of type "a1" are referenced from files of type "a", then a resolver "A_to_A1" should be used. Or, an entry might be specified that checks the current project type from which the resource is being referenced (such as "Web project" or "Java™ project"), and that identifies a resolver to be used for that project type. It will be apparent to one of ordinary skill in the art that a number of other types of values might be used for determining which resolver(s) to select. ("Java" is a trademark of Sun Microsystems, Inc.)

One or more resolvers that are identified as appropriate for this strategy are then loaded (Block 550), if not already available. The resolvers are then called, in an appropriate order (Block 560); see FIG. 6, where this is depicted in more detail.

Once the invocation of the resolver(s) is complete, a resolution for the resource is available (Block 570), and is returned to the invoking client code (Block 580). The invoking code receives this result (Block 590) and uses it to obtain the resource (Block 599). The manner in which a resource is obtained, once the resolution is available, does not form part of the present invention. (If a null result is received at Block 570, an error message may be generated, although this has not been shown in FIG. 5.)

Figure 6:
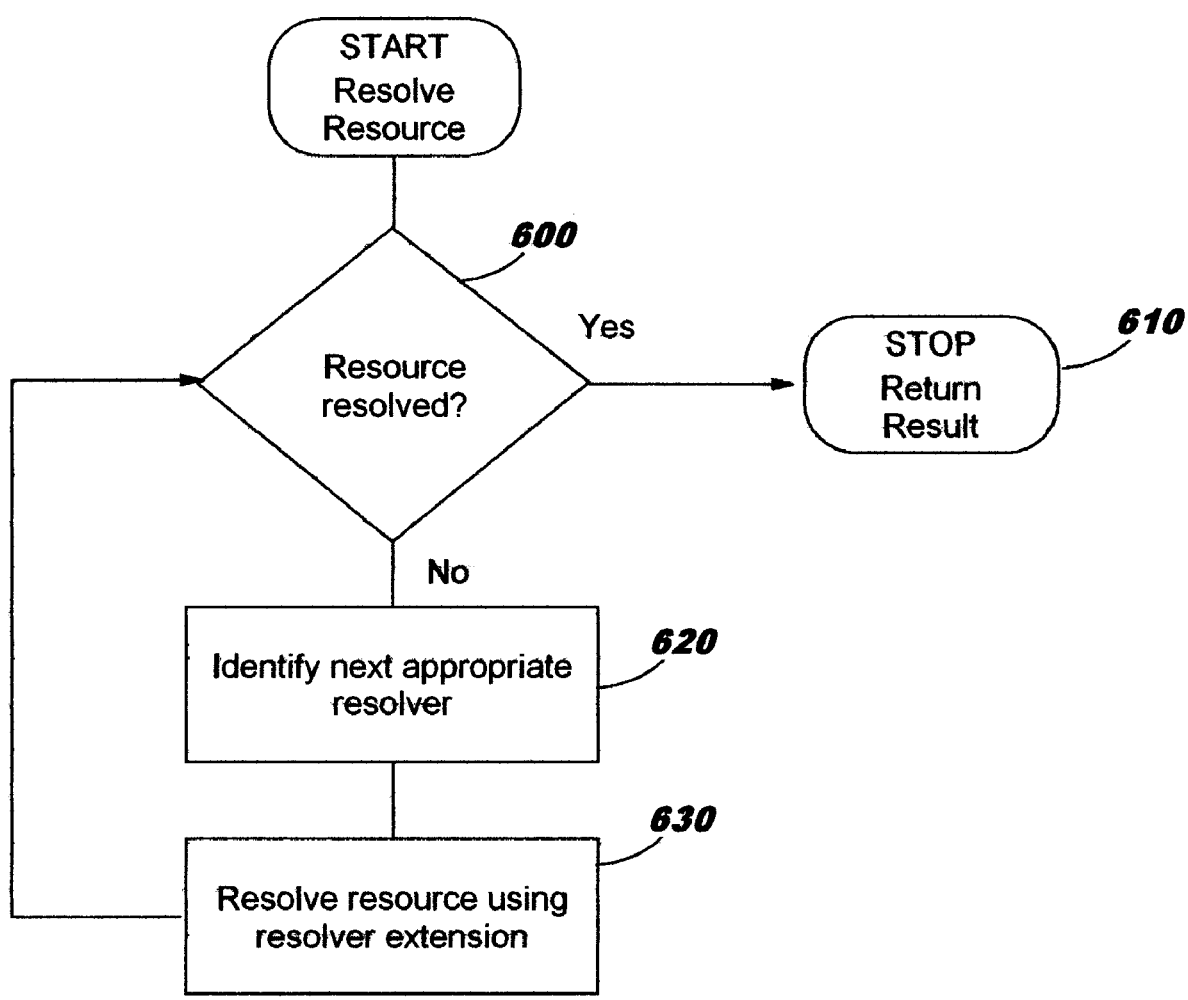
FIG. 6 provides a flowchart depicting use of one or more resolvers which may be called to resolve a resource.

FIG. 6 provides a flowchart illustrating use of one or more resolvers to resolve a resource, according to preferred embodiments. Multiple resolvers may be considered as being "chained" together, as noted earlier. In one approach, the result of each invocation is passed as input to the next resolver, such that each invocation contributes to an overall resolution result, and the result from the last invocation is then returned. Or, in another approach, the result from the first of the resolvers that successfully locates some version of the resource may be returned. As noted earlier, preferred embodiments may specify a priority ordering to determine the order in which the multiple resolvers should be invoked when resolving the resource.

Accordingly, in Block 600, a test is made to determine whether the resource has been resolved. If so, then the obtained result is returned to the invoking code (Block 610). Otherwise, Block 620 obtains an identification of the next appropriate resolver. This preferably comprises using information obtained from the URIResolverExtensionRegistry, as discussed above with reference to Blocks 520 and 530 of FIG. 5. This resolver is then executed to resolve the resource (Block 630). Control then returns to Block 600 to determine whether further resolution is required.

As an example of when multiple resolvers may be appropriate, to be invoked in sequence, suppose the desired resource is identified using a Uniform Resource Locator ("URL"). As one option, the resource might be stored on the Web (e.g., at a Web server). As another option, a user may have stored the resource on his local machine, and registered its location in an XML catalog. Or, the resource may be stored in local cache on the user's machine.

Further suppose that an editor tool is being used, and needs to obtain a resource during the editing process. When using prior art techniques, if resource locations have been registered using an XML catalog, then the editor (and all other tools that might reference the resources stored at the registered locations) must be explicitly programmed to call this catalog to check for the resource; if the resource is not found therein, then the editor (or other tool) has to know that it should then check another location, such as checking the local cache. If any of the tools mistakenly omits checking a particular location, then a resource may be overlooked. It may also happen that differences in the search order among tools causes a different version of a resource to be obtained, leading to confusing and possibly inconsistent results. For example, if one tool checks the Web first and checks local cache only if a Web-accessible version of the resource is not found, whereas a second tool checks the cache first and then checks the Web, these tools may return different versions of the resource. By contrast, when preferred embodiments of the present invention use multiple resource resolver extensions for resolving a particular resource, an invocation order specified for the selected resolution strategy (e.g., using priority attribute values) is preferably used.

As another prior art scenario, a workbench product that provides various types of editors (such as a WSDL editor, an XML editor, a schema editor, etc.), parsers, code generators, validators, and so forth may encounter many resource resolution requests. These tools may interact with one another inappropriately, which may (for example) cause a file path value to become corrupted. This may (for example) result in an editor being able to locate a particular resource while a validator tool (which may have overlooked a file path, or may have received a corrupted file path) cannot find this resource. Allowing a user to edit a file which then cannot complete a validation process due to this type of error leads to inefficiency and user frustration. Rather than requiring each tool to individually implement a proper resource resolution strategy and hoping that it is done correctly, the resource resolution framework of preferred embodiments avoids this undesirable result by allowing all the tools to use the framework interface for resource resolution.

The manner in which a particular resource resolver operates, upon invocation, does not form part of the present invention. From the perspective of the software developer who writes code that needs to obtain a resource, the resolver framework preferably operates as a black box which, when given a resource identifier, returns a location of the resource.

URI normalization, discussed earlier, generally comprises removing certain embedded characters from a URI. For example, the ".", "\", and space characters may be removed from a URI during normalization. Normalization may be considered as a type of resource resolution strategy, and a priority ordering attribute may control when this normalization occurs with regard to the overall resource resolution process. For example, normalization may be invoked prior to invoking one or more resolver extensions. Or, it may be desirable to perform normalization last (or at some other point). The resolver extensions that are registered with the resolver framework may also specify whether they are to be invoked prior to normalization, or after normalization. When priority values are specified as attributes of registered extensions, these priority values may be interpreted in concert with the "resolutionStage" attribute (as discussed above; see reference number 414 of FIG. 4) to separately prioritize prenormalization resolvers and postnormalization resolvers.

Techniques of preferred embodiments have been described with reference to resolution of URIs. However, this is by way of illustration and not of limitation. In alternative embodiments, techniques disclosed herein may be used to resolve other types of identifiers, including a Java™ class path (thus locating a class library, for example) or to resolve references to resources that may be stored in a Universal Description, Discovery, and Integration ("UDDI") registry. In the Java™ class path approach, for example, class path resolvers may be supplied as extensions to the resolver framework. Techniques disclosed herein may be used by software tools that utilize linked resources associated by URI references such as HTML and XML documents, JavaServer Pages™, and so forth.

("Java" and "JavaServer Pages" are trademarks of Sun Microsystems, Inc.) As other illustrative (but not limiting) alternative embodiments, techniques disclosed herein may be used for logical resolution (e.g., mapping one URI to another URI), or for other purposes such as looking up tables in a database or names in an address book. A resolver framework as disclosed herein may be used in scenarios such as locating the correct phone on a phone network, given a fully-qualified phone number (i.e., a number that includes the country, area, and local code) or a partially-qualified phone number (i.e., a phone number that does not include all of country, area, and local code numbers).

As will be appreciated by one of skill in the art, embodiments of the present invention may be provided as methods, systems, and/or computer program products comprising computer-readable program code. Accordingly, the present invention may take the form of an entirely software embodiment, an entirely hardware embodiment, or an embodiment combining software and hardware aspects. In a preferred embodiment, the invention is implemented in software, which includes (but is not limited to) firmware, resident software, microcode, etc.

Furthermore, embodiments of the invention may take the form of a computer program product accessible from computer-usable or computer-readable media providing program code for use by, or in connection with, a computer or any instruction execution system. For purposes of this description, a computer-usable or computer-readable medium may be any apparatus that can contain, store, communicate, propagate, or transport a program for use by, or in connection with, an instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, removable computer diskette, random access memory ("RAM"), read-only memory ("ROM"), rigid magnetic disk, and optical disk. Current examples of optical disks include compact disk with read-only memory ("CD-ROM"), compact disk with read/write ("CD-R/W"), and DVD.

Figure 7:
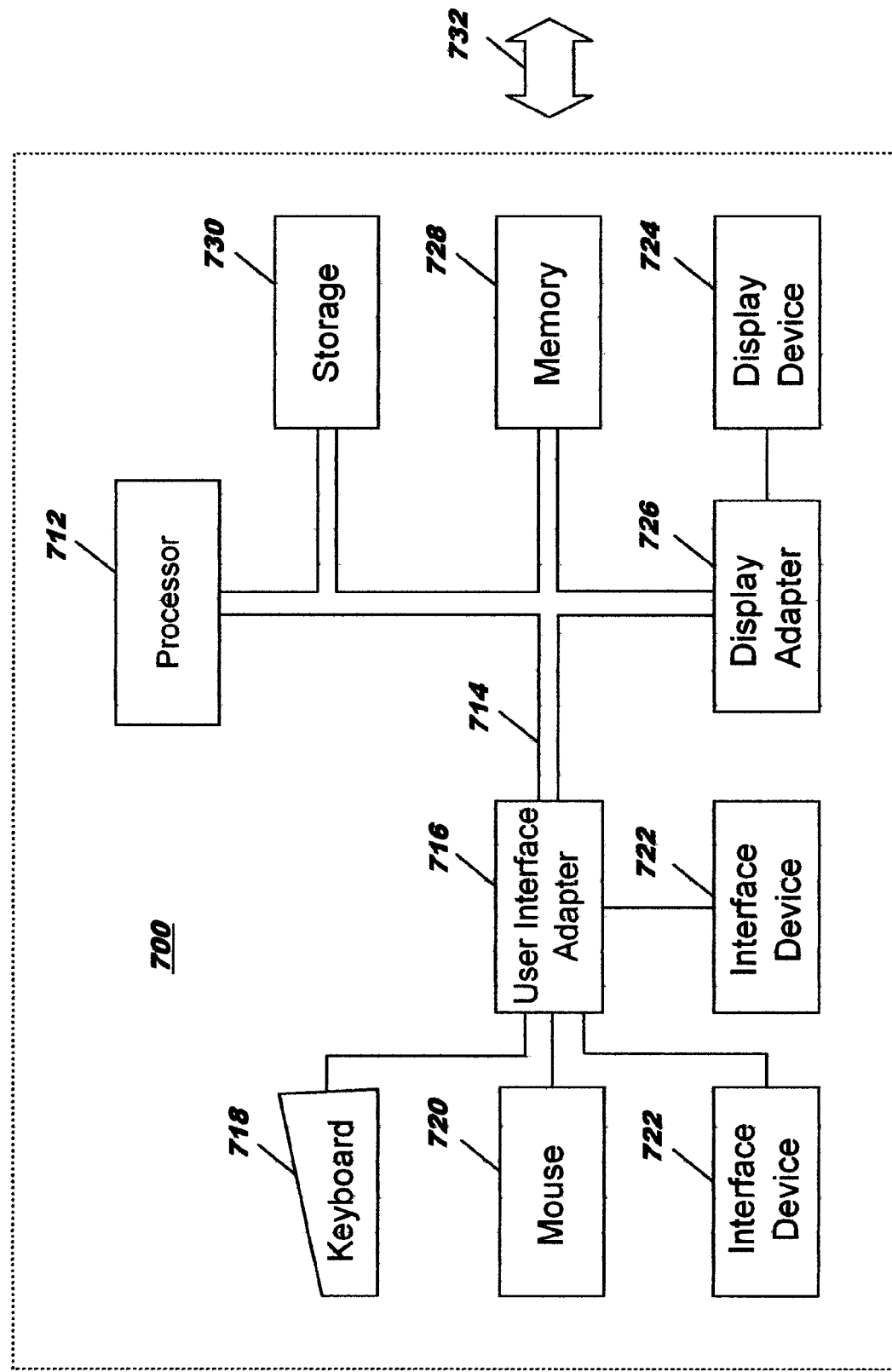
FIG. 7 depicts a data processing system suitable for storing and/or executing program code.

Referring now to FIG. 7, a data processing system 700 suitable for storing and/or executing program code includes at least one processor 712 coupled directly or indirectly to memory elements through a system bus 714. The memory elements may include local memory 728 employed during actual execution of the program code, bulk storage 730, and cache memories (not shown) which provide temporary storage of at least some program code in order to reduce the number of times code must be retrieved from bulk storage during execution.

Input/output ("I/O") devices (including but not limited to keyboards 718, displays 724, pointing devices 720, other interface devices 722, etc.) can be coupled to the system either directly or through intervening I/O controllers or adapters (716, 726).

Network adapters may also be coupled to the system to enable the data processing system to become coupled to other data processing systems or remote printers or storage devices through intervening private or public networks (as shown generally at 732). Modems, cable modem attachments, wireless adapters, and Ethernet cards are just a few of the currently-available types of network adapters.

Figure 8:
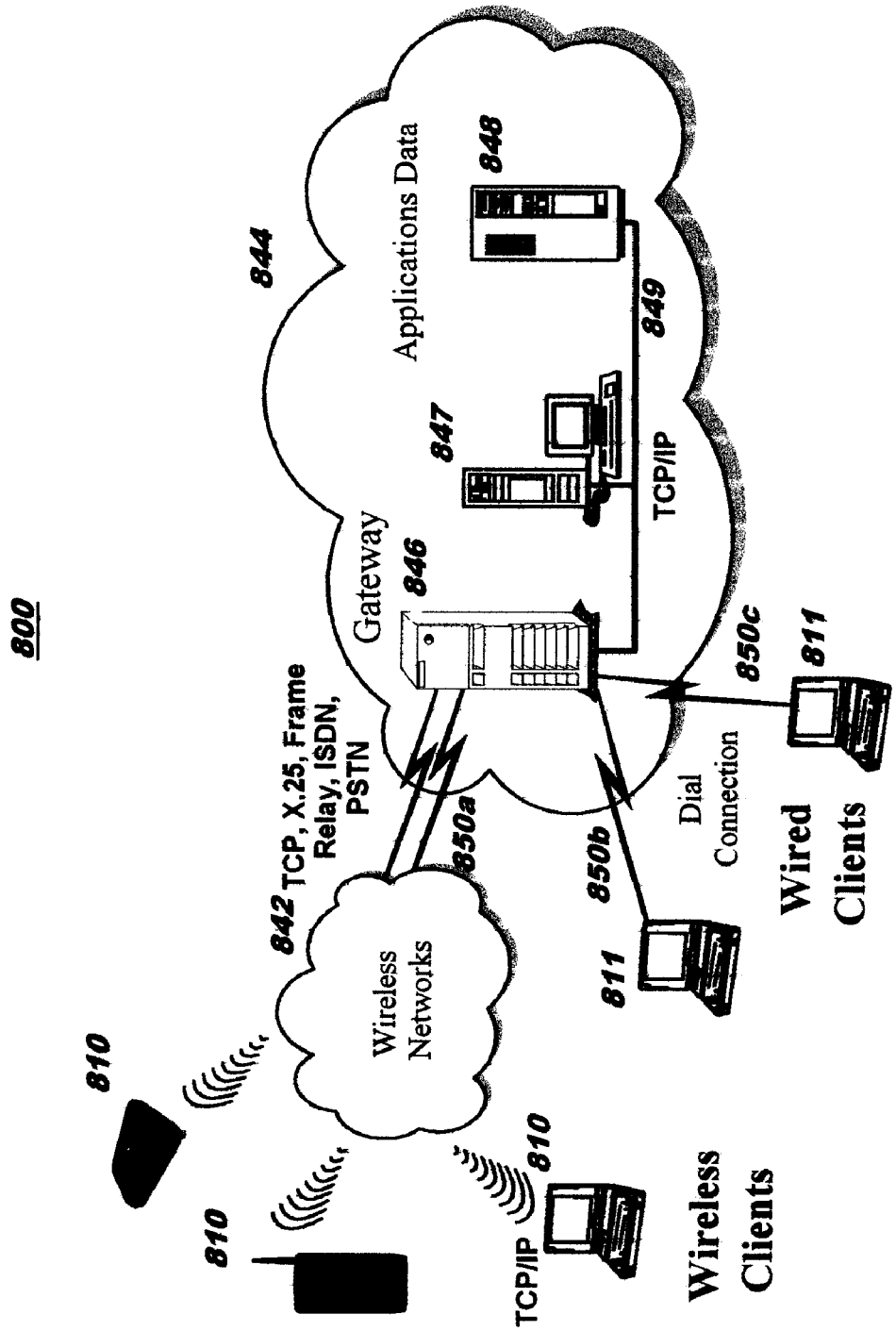
FIG. 8 depicts a representative networking environment in which one or more embodiments of the present invention may be used.

FIG. 8 illustrates a data processing network environment 800 in which the present invention may be practiced. The data processing network 800 may include a plurality of individual networks, such as wireless network 842 and network 844. A plurality of wireless devices 810 may communicate over wireless network 842, and a plurality of wired devices, shown in the figure (by way of illustration) as workstations 811, may communicate over network 844. Additionally, as those skilled in the art will appreciate, one or more local area networks ("LANs") may be included (not shown), where a LAN may comprise a plurality of devices coupled to a host processor.

Still referring to FIG. 8, the networks 842 and 844 may also include mainframe computers or servers, such as a gateway computer 846 or application server 847 (which may access a data repository 848). A gateway computer 846 serves as a point of entry into each network, such as network 844. The gateway 846 may be preferably coupled to another network 842 by means of a communications link 850a. The gateway 846 may also be directly coupled to one or more workstations 811 using a communications link 850b, 850c, and/or may be indirectly coupled to such devices. The gateway computer 846 may be implemented utilizing an Enterprise Systems Architecture/370™ available from the International Business Machines Corporation ("IBM®"), an Enterprise Systems Architecture/390® computer, etc. Depending on the application, a midrange computer, such as an Application System/400® (also known as an AS/400®) may be employed. ("Enterprise Systems Architecture/370" is a trademark of IBM; "IBM", "Enterprise Systems Architecture/390", "Application System/400", and "AS/400" are registered trademarks of IBM.)

The gateway computer 846 may also be coupled 849 to a storage device (such as data repository 848).

Those skilled in the art will appreciate that the gateway computer 846 may be located a great geographic distance from the network 842, and similarly, the wireless devices 810 and/or workstations 811 may be located some distance from the networks 842 and 844, respectively. For example, the network 842 may be located in California, while the gateway 846 may be located in Texas, and one or more of the workstations 811 may be located in Florida. The wireless devices 810 may connect to the wireless network 842 using a networking protocol such as the Transmission Control Protocol/Internet Protocol ("TCP/IP") over a number of alternative connection media, such as cellular phone, radio frequency networks, satellite networks, etc. The wireless network 842 preferably connects to the gateway 846 using a network connection 850a such as TCP or User Datagram Protocol ("UDP") over IP, X.25, Frame Relay, Integrated Services Digital Network ("ISDN"), Public Switched Telephone Network ("PSTN"), etc. The workstations 811 may connect directly to the gateway 846 using dial connections 850b or 850c. Further, the wireless network 842 and network 844 may connect to one or more other networks (not shown), in an analogous manner to that depicted in FIG. 8.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention. Furthermore, it should be understood that use of "a" or "an" in the claims is not intended to limit embodiments of the present invention to a singular one of any element thus introduced.

What is claimed is:

1. A computer-implemented method of resolving locations of resources, comprising:
   receiving, at a resource resolution interface component, a request for resolving a location of a resource;
   selecting, by the resource resolution interface component, at least one resource resolver for resolving the location of the resource, responsive to receiving the request;
   invoking, by the resource resolution interface component, at least one of the selected resource resolvers to resolve the location of the resource, such that a resolution result for the location of the resource is obtained; and
   returning, by the resource resolution interface component, the resolution result as a response to the request.

2. The method according to claim 1, wherein the request identifies the resource and conveys information usable by the selecting of the at least one resource resolver.

3. The method according to claim 2, wherein the conveyed information comprises at least one parameter specifying execution context information of an execution context from which the request was received.

4. The method according to claim 3, wherein the execution context information comprises a location of a resource that referenced the resource to be resolved.

5. The method according to claim 3, wherein the execution context information comprises a project in which a reference to the resource was encountered, and wherein the request is generated responsive to encountering the reference.

6. The method according to claim 2, wherein the identification of the resource further comprises a file type of the resource.

7. The method according to claim 3, wherein the execution context information comprises a file type of a resource that referenced the resource to be resolved.

8. The method according to claim 1, wherein:
   the request identifies the resource and conveys at least one parameter specifying a location of a resource that referenced the resource to be resolved;
   identification of a project in which the reference occurred is determined using the specified location; and
   the project identification is used by the selecting of the at least one resource resolver.

9. The method according to claim 1, wherein:
   a plurality of resource resolvers are identified in a resolver extension registry, each having associated therewith at least one criterion usable for determining when to select the associated resource resolver; and
   the selecting of the at least one resource resolver further comprises evaluating the at least one criterion to select from among the plurality of resource resolvers identified in the resolver extension registry.

10. The method according to claim 1, wherein:
    a plurality of resource resolvers are selected by the selecting of the at least one resource resolver; and
    the invoking uses a priority value associated with each resource resolver to determine an order in which to invoke each of the selected resource resolvers.

11. The method according to claim 10, wherein a contribution to the resolution result is obtained from each of the invoked resource resolvers and is passed as input to a next-invoked one of the resource resolvers.

12. The method according to claim 10, wherein the invoking ceases the invocations upon one of the invoked resource resolvers successfully resolving the location of the requested resource to create the resolution result.

13. The method according to claim 9, wherein:
each resource resolver is registered with the resolver extension registry using a resolver specification that identifies a location of an implementation of the resolver; and
the invoking uses the identified location.

14. The method according to claim 13, wherein:
the resolver specification further specifies a file type value; and
the selecting of the at least one resource resolver compares the file type value to a file type from the request to determine whether to select this resource resolver.

15. The method according to claim 13, wherein:
the resolver specification further specifies a project identifier value; and
the selecting of the at least one resource resolver compares the project identifier value to a project identifier from the request to determine whether to select this resource resolver.

* * * * *